United States Patent
Sakurai et al.

(10) Patent No.: US 7,530,335 B2
(45) Date of Patent: May 12, 2009

(54) INTERNAL COMBUSTION ENGINE AND STARTING CONTROL DEVICE OF INTERNAL COMBUSTION ENGINE

(75) Inventors: Kazuhiro Sakurai, Gotenba (JP); Kazuhiro Wakao, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 176 days.

(21) Appl. No.: 11/793,310

(22) PCT Filed: Aug. 2, 2006

(86) PCT No.: PCT/JP2006/015318

§ 371 (c)(1),
(2), (4) Date: Jun. 19, 2007

(87) PCT Pub. No.: WO2007/015522

PCT Pub. Date: Feb. 8, 2007

(65) Prior Publication Data

US 2008/0110419 A1      May 15, 2008

(30) Foreign Application Priority Data

Aug. 3, 2005    (JP) .............................. 2005-225887

(51) Int. Cl.
*F02G 5/04* (2006.01)
*F02M 1/12* (2006.01)
(52) U.S. Cl. ........................ 123/3; 123/491; 123/543; 123/179.13; 123/179.15; 60/300
(58) Field of Classification Search ................ 123/1 A, 123/2, 3, 491, 453, 536, 543, 544, 179.7, 123/179.12, 179.13, 179.14, 179.15, DIG. 12; 60/299, 300
See application file for complete search history.

(56) References Cited

U.S. PATENT DOCUMENTS

| | | | | |
|---|---|---|---|---|
| 4,520,764 A | * | 6/1985 | Ozawa et al. | 123/3 |
| 6,463,889 B2 | * | 10/2002 | Reddy | 123/3 |
| 6,655,130 B1 | * | 12/2003 | Kirwan et al. | 60/284 |
| 6,997,142 B2 | * | 2/2006 | Wakao et al. | 123/3 |
| 7,117,668 B2 | * | 10/2006 | Nashburn et al. | 60/286 |
| 7,174,861 B2 | * | 2/2007 | Allston et al. | 123/1 A |
| 7,482,303 B2 | * | 1/2009 | Bosteels | 502/180 |
| 2005/0076636 A1 | * | 4/2005 | Nashburn et al. | 60/284 |

(Continued)

FOREIGN PATENT DOCUMENTS

JP    A-2001-012321    1/2001

(Continued)

*Primary Examiner*—Hai H Huynh
(74) *Attorney, Agent, or Firm*—Oliff & Berridge, PLC

(57) ABSTRACT

The internal combustion engine includes a reformer, and a heating unit composed of a power source connected to a reforming catalyst composed by carrying a catalyst on a metal foil, a positive electrode, and a negative electrode of the reforming catalyst. The reformer includes the reforming catalyst, and reforms a reforming mixture of reforming fuel and reforming air by the reforming catalyst to generate reformed gas containing hydrogen. This reformed gas is supplied to a combustion chamber of the internal combustion engine. Before the reforming mixture is supplied to the reforming catalyst, a temperature of the reforming catalyst is raised to a predetermined preheating temperature higher than an adiabatic reaction temperature in partial oxidation reaction, and then the internal combustion engine is started.

18 Claims, 10 Drawing Sheets

U.S. PATENT DOCUMENTS

| | | | |
|---|---|---|---|
| 2005/0087437 A1 | 4/2005 | Sakurai et al. | |
| 2007/0204813 A1* | 9/2007 | Arai et al. | 123/25 A |
| 2007/0220873 A1* | 9/2007 | Bosteels | 60/299 |

FOREIGN PATENT DOCUMENTS

| | | |
|---|---|---|
| JP | A-2001-050118 | 2/2001 |
| JP | A-2001-227419 | 8/2001 |
| JP | A-2004-284835 | 10/2004 |
| JP | A-2005-127291 | 5/2005 |

\* cited by examiner

INTERNAL COMBUSTION ENGINE AND STARTING CONTROL DEVICE OF INTERNAL COMBUSTION ENGINE

TECHNICAL FIELD

The present invention relates to an internal combustion engine that combusts reformed gas obtained by reforming a mixture of air and hydrocarbon fuel at least at starting time, and a starting control device of the internal combustion engine.

BACKGROUND ART

Conventionally, there has been known an internal combustion engine in which reformed gas obtained by reforming a mixture of air and hydrocarbon fuel by a reforming catalyst is supplied to a suction pipe of the internal combustion engine. Patent Document 1 discloses such an internal combustion engine involving a technique of reforming by preheating the reforming catalyst with a heater, and after the reforming catalyst reaches a temperature at which the reforming is enabled, injecting the fuel to the reforming catalyst.

Patent Document 1: Japanese Patent Application Laid-Open No. 2001-050118

DISCLOSURE OF INVENTION

Problem to be Solved by the Invention

However, in the technique disclosed in Patent Document 1, there is a possibility that even if the temperature of the reforming catalyst is raised to the temperature at which reforming is enabled, the supply of the fuel causes a reduction in temperature of the reforming catalyst, resulting in insufficient reforming, and thus, increasing unreformed hydrocarbon (hereinafter, unreformed HC) contained in the reformed gas supplied to the internal combustion engine. At the starting time of the internal combustion engine, the increase in the unreformed HC leads to an increase in uncombusted HC in exhaust gas exhausted from the internal combustion engine. As a result, the exhaust gas of the internal combustion engine is not purified because an exhaust purifying catalyst provided in an exhaust system has not reached an active temperature, so that there has been a possibility that the uncombusted HC is exhausted into the atmosphere.

Consequently, this invention is made in light of the foregoing. It is an object of this invention to provide an internal combustion engine in which reformed gas obtained by reforming a mixture of air and hydrocarbon fuel with a reforming catalyst is supplied, the internal combustion engine being capable of suppressing an increase in unreformed HC, and a starting control device of the internal combustion engine.

Means for Solving Problem

To solve the problem and achieve the object, the present invention provides an internal combustion engine driven by igniting a mixture of air and fuel with a spark unit to thereby combust the fuel in a combustion chamber, the internal combustion engine comprising a reforming unit that reforms a reforming mixture of reforming fuel and reforming air with a reforming catalyst to generate reformed gas containing hydrogen and supply this reformed gas to the combustion chamber, a reforming catalyst heating unit that raises a temperature of the reforming catalyst to a predetermined preheating temperature higher than an adiabatic reaction temperature in partial oxidation reaction of the reforming fuel, before the reforming mixture is supplied to the reforming catalyst, and starting unit that starts the internal combustion engine, the starting unit starting the internal combustion engine after the reforming by the reforming catalyst starts.

An internal combustion engine according to another embodiment of the present invention is characterized in that in the internal combustion engine, the preheating temperature is higher than a sum of the adiabatic reaction temperature in the partial oxidation reaction and a temperature of the reforming catalyst that drops from the supply of the reforming mixture to the reforming catalyst till the start of the partial oxidation reaction.

An internal combustion engine according to another embodiment of the present invention is characterized in that in the internal combustion engine, the starting unit starts the internal combustion engine after the reforming mixture is supplied to the reforming catalyst, and then the temperature of the reforming catalyst becomes lower than a difference between the preheating temperature and the temperature of the reforming catalyst that drops until the partial oxidation reaction starts.

An internal combustion engine according to another embodiment of the present invention is characterized in that in the internal combustion engine, the heating by the reforming catalyst heating unit is stopped before the starting of the internal combustion engine.

An internal combustion engine according to another embodiment of the present invention is characterized in that in the internal combustion engine, the heating by the reforming catalyst heating unit is stopped at the point of time when the reforming mixture is supplied to the reforming catalyst or later.

An internal combustion engine according to another embodiment of the present invention is characterized in that in the internal combustion engine, the heating of the reforming catalyst by the reforming catalyst heating unit is stopped, and then the reforming mixture is supplied to the reforming catalyst.

In another embodiment, the present invention provides an internal combustion engine driven by igniting a mixture of air and fuel with a spark unit to thereby combust the fuel in a combustion chamber, the internal combustion engine comprising a reforming unit that reforms a reforming mixture of reforming fuel and reforming air with a reforming catalyst to generate reformed gas containing hydrogen and supply this reformed gas to the combustion chamber; a reforming catalyst heating unit in which the reforming air is first supplied to the reforming catalyst, and then the reforming fuel is supplied to the reforming catalyst, and before the reforming air is supplied to the reforming unit, a temperature of the reforming catalyst is raised to a predetermined preheating temperature higher than an adiabatic reaction temperature in partial oxidation reaction of the reforming fuel; and a starting unit that starts the internal combustion engine after the reforming by the reforming catalyst starts, wherein the internal combustion engine is started after the reforming by the reforming catalyst starts.

An internal combustion engine according to another embodiment of the present invention is characterized in that in the internal combustion engine, the preheating temperature is higher than the sum of the adiabatic reaction temperature in the partial oxidation reaction and a temperature of the reforming catalyst that drops by the supply of the reforming air to the reforming catalyst.

An internal combustion engine according to another embodiment of the present invention is characterized in that the heating of the reforming catalyst by the reforming catalyst heating unit is stopped in the internal combustion engine, before the starting of the internal combustion engine.

An internal combustion engine according to another embodiment of the present invention is characterized in that in the internal combustion engine, the starting unit starts the internal combustion engine after a predetermined standby time elapses from the supply of the reforming fuel to the reforming catalyst.

An internal combustion engine according to another embodiment of the present invention is characterized in that in the internal combustion engine, the heating of the reforming catalyst by the reforming catalyst heating unit is stopped at the point of time when the reforming air is supplied to the reforming catalyst or later.

An internal combustion engine according to another embodiment of the present invention is characterized in that in the internal combustion engine, the heating of the reforming catalyst by the reforming catalyst heating unit is stopped before the reforming air is supplied to the reforming catalyst.

An internal combustion engine according to another embodiment of the present invention is characterized in that in the internal combustion engine, the heating of the reforming catalyst by the reforming catalyst heating unit is stopped at the point of time when the reforming fuel is supplied to the reforming catalyst or later.

An internal combustion engine according to another embodiment of the present invention is characterized in that in the internal combustion engine, the heating of the reforming catalyst by the reforming catalyst heating unit is stopped, and then the reforming fuel is supplied to the reforming catalyst.

An internal combustion engine according to another embodiment of the present invention is characterized in that in the internal combustion engine, the preheating temperature is changed in accordance with at least one of properties of the reforming air and properties of the reforming fuel.

In another embodiment, the present invention provides a starting control device of an internal combustion engine which controls an internal combustion engine driven by igniting a mixture of air and fuel with a spark unit to thereby combust the fuel in a combustion chamber, the starting control device comprising a reforming unit that reforms a reforming mixture of reforming fuel and reforming air with a reforming catalyst to generate reformed gas containing hydrogen and supply this reformed gas to the combustion chamber, and a reforming catalyst heating unit that raises a temperature of the reforming catalyst, wherein the starting control device includes a heating control unit that raises the temperature of the reforming catalyst to a predetermined preheating temperature higher than an adiabatic reaction temperature in partial oxidation reaction of the reforming fuel by the reforming catalyst heating unit, before the reforming mixture is supplied to the reforming catalyst, a reforming control unit that supplies the reforming mixture to the reforming catalyst after the temperature of the reforming catalyst becomes higher than the preheating temperature, and a starting control unit that starts the internal combustion engine after the reforming by the reforming catalyst starts.

In another embodiment, the present invention provides a starting control device of an internal combustion engine which controls an internal combustion engine driven by igniting a mixture of air and fuel with a spark unit to thereby combust the fuel in a combustion chamber, the starting control device comprising a reforming unit that reforms a reforming mixture of reforming fuel and reforming air with a reforming catalyst to generate reformed gas containing hydrogen and supply this reformed gas to the combustion chamber, and a reforming catalyst heating unit that raises a temperature of the reforming catalyst, wherein the starting control device includes a heating control unit that raises the temperature of the reforming catalyst to a predetermined preheating temperature higher than an adiabatic reaction temperature in partial oxidation reaction of the reforming fuel by the reforming catalyst heating unit, before the reforming air is supplied to the reforming catalyst, a reforming control unit that supplies the reforming air to the reforming catalyst after the temperature of the reforming catalyst becomes higher than the preheating temperature, and then the reforming fuel is supplied to the reforming catalyst, and a starting control unit that starts the internal combustion engine after the reforming by the reforming catalyst starts.

Effect of the Invention

The internal combustion engine and the starting control device of the internal combustion engine according to the present invention can suppress an increase in unreformed HC, in the internal combustion engine in which the reformed gas obtained by reforming the mixture of air and hydrocarbon fuel with the reforming catalyst is supplied.

EXPLANATIONS OF LETTERS OR NUMERALS

1 Internal Combustion Engine
1B Combustion Chamber
3 Suction Passage
9 Reformed Gas Inlet
10 Reformer
10C Reforming Catalyst
10S Case
15 Heater Switch
16 Mixing Chamber
18 Reforming Air Port
19 Reformer Outlet
20 Reforming Fuel Injection Valve
21 Reforming Fuel Duct
22 Reforming Air Duct
23 Reforming Air Supply Valve
24 Reforming Air Pump
25 Reforming Fuel Pump
26 Starter Motor
27 Reformed Gas Duct
29 Spark Plug
30 Engine ECU
30CA Starting Control Device of Internal Combustion Engine
30c Engine Control Unit
31 Heating Control Unit
32 Reforming Control Unit
33 Starting Control Unit
34 Parameter Setting Unit
40 Reforming Catalyst Temperature Sensor
43 Starting Switch
44 Reforming Air Temperature Sensor

BEST MODES FOR CARRYING OUT THE INVENTION

Hereinafter, the present invention is described in detail with reference to the drawings. The present invention is not limited by the best modes (hereinafter, referred to as embodiments) for carrying out this invention. Moreover, components in the below-described embodiments include components that those skilled in the art can easily assume or ones substantially identical with them. Furthermore, the present invention can be preferably applied to, particularly, an internal combustion engine mounted on a vehicle such as a car, bus or truck.

Embodiment 1

This embodiment is featured by raising the temperature of a reforming catalyst included by a reforming unit to a predetermined preheating temperature higher than an adiabatic reaction temperature in partial oxidation reaction of reforming fuel before starting partial oxidation reforming by the reforming unit.

Figure 1:
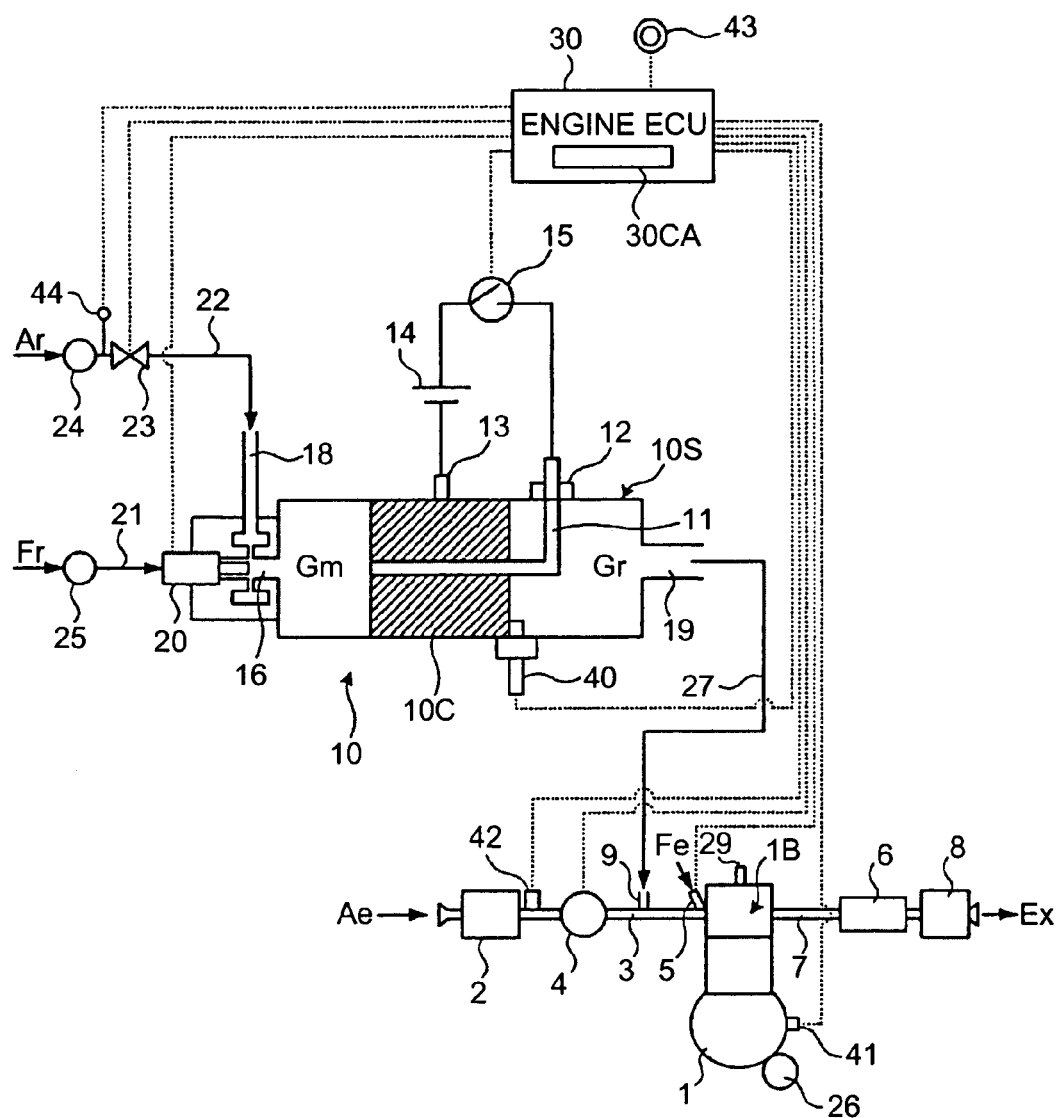
FIG. 1 is an entire configuration diagram of an internal combustion engine according to Embodiment 1.

FIG. 1 is an entire configuration diagram of an internal combustion engine according to Embodiment 1. By using FIG. 1, a configuration of the internal combustion engine according to this embodiment is described. In an internal combustion engine 1 according to this embodiment, reforming fuel Fr, which is hydrocarbon fuel (for example, gasoline) and reforming air Ar are supplied to a reformer 10 which is the reforming unit to generate a reforming mixture Gm. This reforming mixture Gm is led to a reforming catalyst 10C, where the partial oxidation reaction is evoked to generate reformed gas Gr containing $H_2$ (hydrogen) and CO (carbon monoxide). The reformer 10 supplies the reformed gas Gr obtained by the partial oxidation reaction to a combustion chamber 1B of the internal combustion engine 1.

The internal combustion engine 1 according to this embodiment is a piston engine that generates power by reciprocating motion of a piston within a cylinder, and the number of cylinders and cylinder arrangement are not particularly limited. Also, the internal combustion engine 1 may be a so-called rotary internal combustion engine. The internal combustion engine 1 is driven by combustion of a combusting mixture of engine fuel Fe and combusting air Ae inside of the combustion chamber 1B. The internal combustion engine 1 starts by rotating a starter motor 26, which is a starting unit, by a starting signal from a starting switch 43.

A flow of the combusting air Ae supplied to the internal combustion engine 1 is adjusted by a throttle valve 4 provided in a suction passage 3. Dirt and dust are removed in an air cleaner 2 provided at an entrance of the suction passage 3, and then, an intake air amount is measured in an air flow sensor 42 provided upstream of the throttle valve 4 in the suction passage 3. The measured value is taken in by an engine ECU (Electronic Control Unit) 30. The engine ECU 30 determines a supply amount of the engine fuel Fe to the internal combustion engine 1 from an intake air amount Ga measured by the air flow sensor 42 and an engine rotational speed Ne of the internal combustion engine 1 measured by a rotational speed sensor 41.

The engine ECU 30 injects the engine fuel Fe to the combusting air Ae within the suction passage 3 from a port injection valve 5 provided in the suction passage 3, based on the determined supply amount of the engine fuel Fe to form the combusting mixture. This combusting mixture is introduced to the inside of the combustion chamber 1B of the internal combustion engine 1, and is ignited by a spark plug 29, which is a spark unit, to be combusted. While in this embodiment, the engine fuel Fe is supplied to the internal combustion engine 1 from the port injection valve 5 provided in the suction passage of the internal combustion engine 1, the engine fuel Fe may be supplied to the internal combustion engine 1 by a so-called direct injection valve that injects the engine fuel Fe directly to the inside of the combustion chamber 1B. Furthermore, both the port injection valve 5 and the direct injection valve may be included, and the engine fuel Fe may be supplied to the internal combustion engine 1 with varying a fuel injection ratio of both in accordance with an operating condition.

The combusting mixture combusted in the combustion chamber 1B of the internal combustion engine 1 is exhausted from an exhaust passage 7 as an exhaust gas Ex. This exhaust gas Ex is purified in a purification catalyst 6 provided in the exhaust passage 7, and then is released into the atmosphere through a silencer 8. In this silencer 8, noise at the time of release into the atmosphere is reduced. Next, the reformer 10 included by the internal combustion engine 1 according to this embodiment is described.

This reformer 10 reforms the reforming mixture Gm of the reforming fuel Fr, which is hydrocarbon fuel (for example, gasoline), and the reforming air Ar, and supplies the resultant reformed gas Gr containing hydrogen to the combustion chamber 1B of the internal combustion engine 1. The reformer 10 includes the reforming catalyst 10C inside of a case 10S. For the reforming catalyst 10C, for example, a zirconia catalyst or a rhodium catalyst is used, and in this embodiment, a honeycomb-shaped catalyst carrier manufactured by using a metal foil made of a heat-resistant alloy such as stainless steel carries the catalyst to make up the reforming catalyst 10C.

The temperature of the reforming catalyst 10C is raised by a reforming catalyst heating unit. The reforming catalyst 10C includes a central electrode 11 inside thereof, and the central electrode 11 is connected to a positive electrode 12. Moreover, a negative electrode 13 is connected to an outer peripheral portion of the reforming catalyst 10C. The negative electrode 13 is connected to a negative electrode of a power source 14, and the positive electrode 12 is connected to a positive electrode of the power source 14. The reforming catalyst heating unit is composed of the power source 14, the negative electrode 13 and the central electrode 11 (that is, the positive electrode 12).

A heater switch 15 is arranged between the positive electrode 12 and the power source 14. The heater switch 15 is intermitted by a starting control device 30CA of the internal combustion engine, which is included by the ECU 30. When the heater switch 15 is turned on, a current flows from the positive electrode 12, that is, the central electrode 11 toward the negative electrode 13. Since the catalyst carrier of the heating-resistant alloy intervenes between the central electrode 11 and the negative electrode 13, the current also flows through the catalyst carrier by flowing from the central electrode 11 to the negative electrode 13. This allows the catalyst carrier of the reforming catalyst 10C to generate heat, so that the reforming catalyst 10C is heated by the reforming catalyst heating unit. The reforming catalyst heating unit is not limited to the configuration, but for example, may use a unit such as one heating the reforming catalyst 10C with a burner.

The reformer 10 includes a reforming catalyst temperature sensor 40 that measures the temperature of the reforming catalyst 10C. While the temperature of the reforming catalyst 10C is a temperature of the catalyst carried by the catalyst carrier, it is difficult to measure the temperature of the catalyst. Here, since the temperature of the catalyst carrier carrying the catalyst (reforming catalyst bed temperature) substantially coincides with the temperature of the catalyst, the temperature of the catalyst carrier is detected by the reforming catalyst temperature sensor 40 and is regarded as the reforming catalyst temperature, which is used for starting control of the internal combustion engine according to this embodiment (hereinafter, similar).

The case 10S of the reformer 10 has a reforming fuel injection valve 20 and a reforming air port 18 attached. To the reforming fuel injection valve 20 is sent the reforming fuel Fr from a reforming fuel pump 25 through a reforming fuel duct 21. The starting control device 30CA of the internal combustion engine, which is included by the engine ECU30, controls the operation of the reforming fuel injection valve 20 to thereby inject the reforming fuel Fr from the reforming fuel injection valve 20 to the reformer 10.

To the reforming air port 18 is sent the reforming air Ar from a reforming air pump 24 through a reforming air duct 22. Moreover, the reforming air duct 22 is provided with a reforming air supply valve 23. The starting control device 30CA of the internal combustion engine, which is included by the engine ECU30, controls the operation of the reforming air supply valve 23 to thereby supply the reforming air Ar to the reformer 10. The reforming air duct 22 is provided with a reforming air temperature sensor 44 to measure a temperature of the reforming air Ar.

At an exit of the reforming fuel injection valve 20, a mixing chamber 16 is provided. The mixing chamber 16 is connected to the reforming air port 18. When the reforming fuel Fr is injected from the reforming fuel injection valve 20, mist of the reforming fuel Fr flows into the mixing chamber 16 together with the reforming air Ar introduced from the reforming air port 18. The reforming fuel Fr and the reforming air Ar are sufficiently mixed in the mixing chamber 16, so that the reforming mixture Gm is formed and flows into the reforming catalyst 10C.

In the reforming catalyst 10C, partial oxidation reaction expressed by formula (1) occurs, and the reformed gas Gr containing CO (carbon monoxide) and $H_2$ (hydrogen) is generated. The partial oxidation reaction does not start until a temperature reaches a certain degree (partial-oxidation-reaction start temperature, about 400° C.) or higher, and thus, the reforming catalyst 10C is heated to the partial-oxidation-reaction start temperature or higher by the reforming catalyst heating unit.

$$C_mH_n+(m/2)O_2 \rightarrow mCO+(n/2)H_2 \qquad (1)$$

The reforming gas Gr generated in the reformer 10 is sent out to the internal combustion engine 1 from a reformer outlet 19. The reformer outlet 19 and a reformed gas inlet 9 provided in the suction passage 3 of the internal combustion engine 1 are connected by a reformed gas duct 27, so that the reformed gas Gr flows into the combustion chamber 1B of the internal combustion engine 1 through the suction passage 3 of the internal combustion engine 1. A cooling unit of the liquid cooling type or air cooling type may be provided in the middle of the reformed gas duct 27 to cool the reformed gas Gr and then, introduce it to the suction passage 3 of the internal combustion engine 1.

A combustion speed of hydrogen ($H_2$) contained in the reformed gas Gr is considerably fast as compared with the reforming fuel Fr such as gasoline, and thus, is combusted rapidly. Accordingly, when the reformed gas Gr containing the hydrogen, which is obtained by the reforming reaction, is supplied to the internal combustion engine 1, the hydrogen in the reformed gas Gr can bring about a combustion improving effect. Moreover, since the reformed gas Gr is gas fuel, it is combusted inside of the combustion chamber 1B without adhering to wall surfaces of the suction passage 3 and the combustion chamber 1B of the internal combustion engine 1. This can reduce HC (hydrocarbon) exhausted from the internal combustion engine 1 in an uncombusted state. At the starting time of the internal combustion engine 1 (particularly at the time of cold starting), the effect of reduction in uncombusted HC is large.

Figure 2:
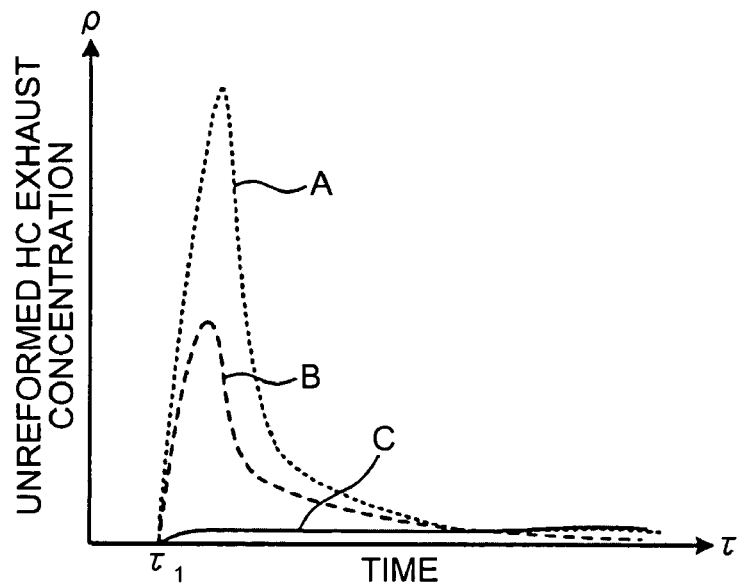
FIG. 2 is an explanatory chart showing a relation between an exhaust concentration of unreformed HC exhausted from a reformer and an elapsed time from the internal combustion engine starting time.
Figure 3:
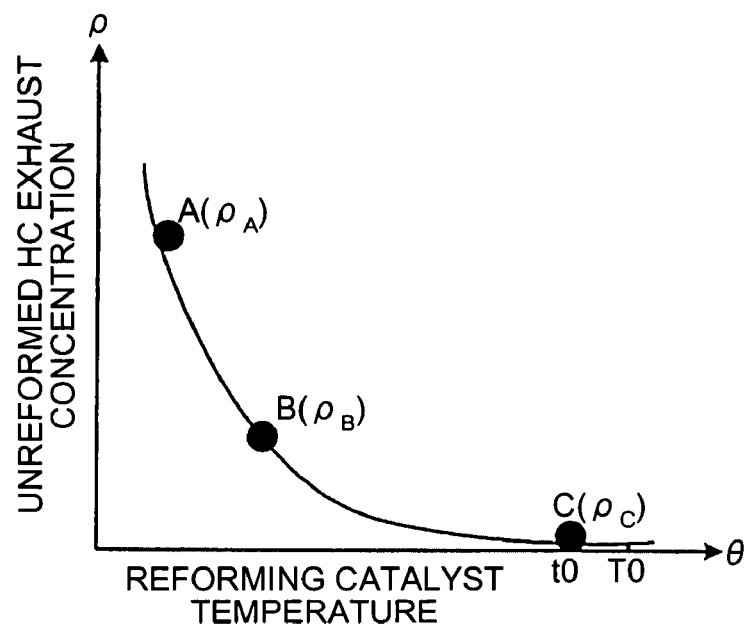
FIG. 3 is an explanatory chart showing a relation between the exhaust concentration of the unreformed HC exhausted from the reformer and a temperature of a reforming catalyst included by the reformer.

FIG. 2 is an explanatory chart showing a relation between an exhaust concentration of unreformed HC, which is exhausted from the reformer, and an elapsed time from the activation time of a reforming system including the reforming unit and the reforming catalyst heating unit. FIG. 3 is an explanatory chart showing a relation between the exhaust concentration of the unreformed HC exhausted from the reformer and the temperature of the reforming catalyst included by the reformer. Reference numerals A, B, and C in FIG. 2 and reference numerals A, B, and C in FIG. 3 correspond to one another. A, B, and C in FIGS. 2 and 3, indicate that the temperature of the reforming catalyst 10C immediately before the reforming is started (hereinafter, referred to as initial temperature) differs. Here, the initial temperature becomes lower in the order of C→B→A.

At the time of reforming, if the initial temperature is low, the partial oxidation reaction hardly occurs, and thus, the unreformed reforming fuel Fr contained in the reformed gas Gr increases. In this embodiment, the reforming fuel Fr is hydrocarbon fuel, and thus, when the initial temperature is low, a concentration ρ of the unreformed HC contained in the reformed gas Gr will increase (FIGS. 2, 3). That is, since the initial temperature becomes lower in the order of C→B→A, the concentration ρ of the unreformed HC becomes higher in the order of $ρ_C → ρ_B → ρ_A$ (FIG. 2).

On the other hand, the partial oxidation reaction is an exothermic reaction, and thus, when the partial oxidation reaction starts, the catalyst temperature 10C is raised by the heat generation of the partial oxidation reaction. This, as shown in FIG. 2, reduces the concentration of the unreformed HC with the progress of the reforming, and after a certain time has elapsed, the concentration of the unreformed HC becomes equivalent in A, B, C. However, if the initial temperature is low, as shown in FIG. 2, the concentration of the unreformed HC immediately after the reforming start increases, and thus, as a whole, the unreformed HC increases as the initial temperature becomes lower. As a result, the uncombusted HC after the combustion in the combustion chamber 1B of the internal combustion engine 1 also increases, which deteriorates the emission. This is remarkable at the starting time, particularly at the cool starting time.

Therefore, at the time of the reforming start, the reforming is started after raising the reforming catalyst 10C by the heating unit. However, even if the reformed catalyst is heated, the reforming catalyst 10C is cooled by the reforming mixture Gm when the reforming mixture Gm consisting of the reforming fuel Fr and the reforming air Ar is supplied to the reforming catalyst 10C. As a result, there has been posed a problem that at the point of time when the reforming is started, the temperature of the reforming catalyst 10C drops, so that a generation amount of the unreformed HC increases.

As shown in FIG. 3, as the initial temperature approaches an adiabatic reaction temperature t0 in the partial oxidation reaction of the reforming fuel Fr, the concentration of the unreformed HC decreases, and when the initial temperature exceeds the adiabatic reaction temperature t0, the concentration of the unreformed HC becomes substantially constant. As a result of keen studies of the problem, the present inventors have found this relation. Furthermore, it has been found that if before the reforming is starting, the temperature of the reforming catalyst 10C is raised to a temperature higher than at least the adiabatic reaction temperature t0, and then the reforming is started, the concentration (that is, the generation amount) of the unreformed HC is reduced. In this embodiment, before the reforming is started, the reforming catalyst 10C is heated to a preheating temperature T0 higher than the adiabatic reaction temperature t0 in the partial oxidation reaction of the reforming fuel Fr. Here, the adiabatic reaction temperature t0 in the partial oxidation reaction in the case where gasoline of the hydrocarbon fuels is used is about 900° C. to 950° C. The adiabatic reaction temperature t0 in the partial oxidation reaction in the case where methanol of the hydrocarbon fuels is used is about 700° C. to 850° C.

Figure 4:
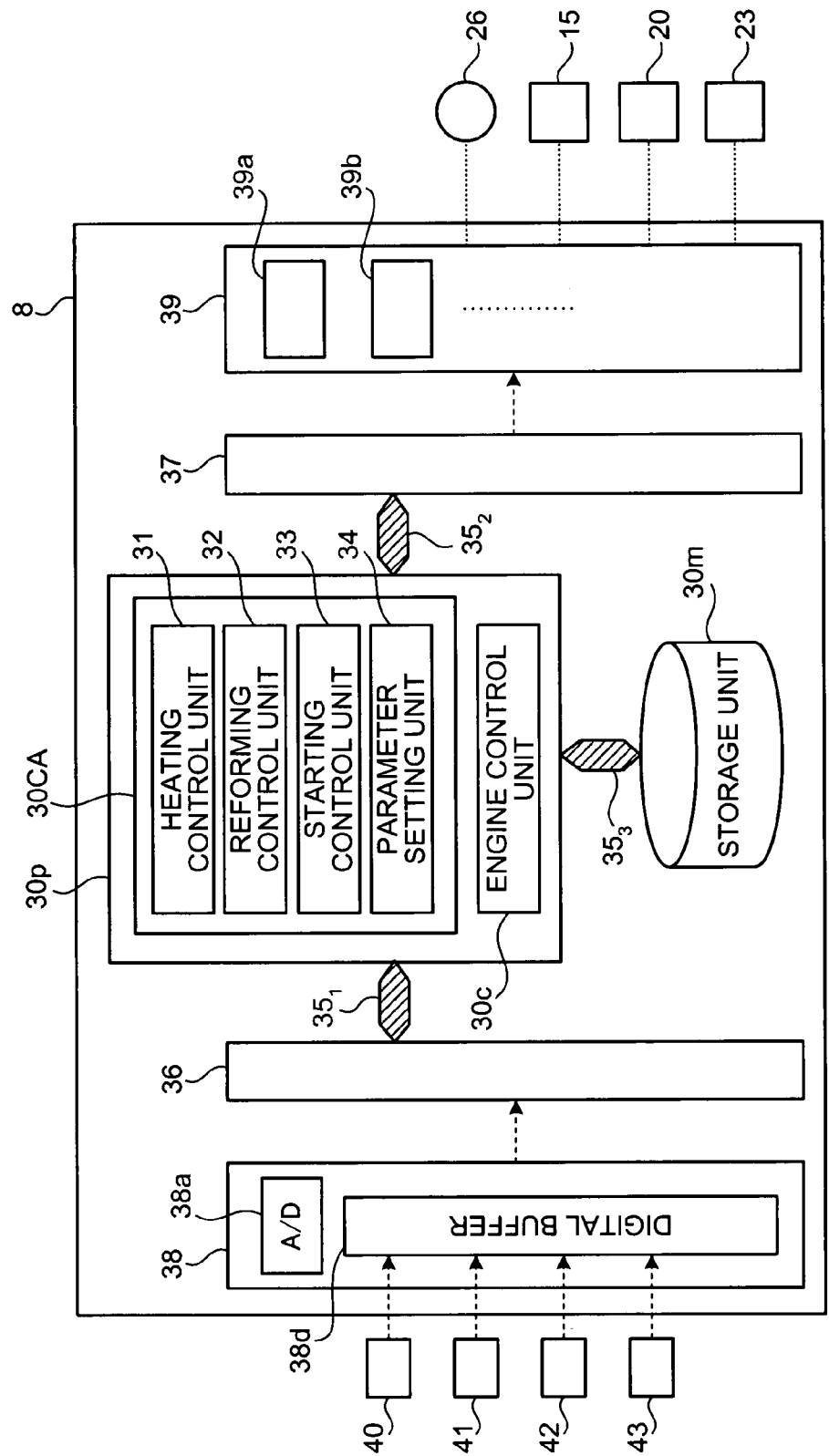
FIG. 4 is an explanatory diagram showing a starting control device of the internal combustion engine according to Embodiment 1.

Next, the starting control device of the internal combustion engine according to this embodiment is described. FIG. 4 is an explanatory diagram showing the starting control device of the internal combustion engine according to Embodiment 1. The starting control of the internal combustion engine according to this embodiment can be realized by the starting control device 30CA of the internal combustion engine according to this embodiment. As shown in FIG. 4, the starting control device 30CA of the internal combustion engine is configured so as to be incorporated into the engine ECU30. The engine ECU30 is composed of a CPU (Central Processing Unit) 30$p$, a storage unit 30$m$, input and output ports 36, 37, and input and output interfaces 38, 39.

The starting control device 30CA of the internal combustion engine according to this embodiment may be prepared separately from the engine ECU30 and be connected to the engine ECU30. A configuration may be employed in which in order to realize the starting control of the internal combustion engine according to this embodiment, the starting control device 30CA of the internal combustion engine can utilize the control function included by the engine ECU30 over the internal combustion engine 1.

The starting control device 30CA of the internal combustion engine according to this embodiment includes a heating control unit 31, a reforming control unit 32, a starting control unit 33, and a parameter setting unit 34. The heating control unit 31, the reforming control unit 32, the starting control unit 33 and the parameter setting unit 34 of these make up a part that executes an operation control method which is a base of the internal combustion engine according to this embodiment. The parameter setting unit 34 has a function of setting parameters such as a preheating temperature described later in the starting control method of the internal combustion engine according to this embodiment. In this embodiment, the starting control device 30CA of the internal combustion engine is configured as a part of the CPU (Central Processing Unit) 30$p$ constituting the engine ECU30. Additionally, the CPU 30$p$ includes an engine control unit 30$c$ that controls the operation of the internal combustion engine 1.

The CPU 30$p$ and the storage unit 30$m$ are connected by a bus $35_3$. Moreover, the starting control device 30CA and the engine control unit 30$c$ of the internal combustion engine are connected through buses $35_1$, $35_2$ and the input port 36 and the output port 37. This allows for the configuration in which the heating control unit 31, the reforming control unit 32, the starting control unit 33, the parameter setting unit 34 and the engine control unit 30$c$, which make up the starting control device 30CA of the internal combustion engine, can exchange control data mutually, or issue an instruction to either one. Also, the starting control device 30CA of the internal combustion engine can acquire data regarding operation control of the internal combustion engine 1 owned by the engine ECU30, or interrupt a starting control routine of the internal combustion engine in the engine ECU30 with the control of the starting control device 30CA of the internal combustion engine.

To the input port 36 is connected the input interface 38. To the input interface 38 are connected the reforming catalyst temperature sensor 40, the starting switch 43 that issues a starting signal of the internal combustion engine 1, the reforming air temperature sensor 44 that detects the temperature of reforming air Ar, and various types of sensors for acquiring information necessary for the starting control. Also, to the input interface 38 are connected the rotational speed sensor 41, the air flow sensor 42, and other sensors that acquire information necessary for the operation control of the internal combustion engine 1. Signals output from these sensors are converted to signals that CPU 30$p$ can utilize by an A/D converter 38$a$ or a digital buffer 38$d$ inside of the input interface 38, and are sent to the input port 38. This allows the CPU 30$p$ to acquire the information necessary for the fuel supply control and the operation control of the internal combustion engine 1.

To the output port 37 is connected the output interface 39. To the output interface 39 are connected the heater switch 15, the reforming fuel injection valve 20, the reforming air supply valve 23, the starter motor 26, and other control objects, which are necessary for the reforming control and the starting of the internal combustion engine 1. The output interface 39 includes control circuits 39$a$, 39$b$ and the like, and operates the control objects based on control signals calculated in the CPU 30$p$. With such a configuration, based on the output signals from the sensors, the CPU 30$p$ of the engine ECU30 can control the supply of the fuel to the internal combustion engine 1 and control the operation of the internal combustion engine 1.

In the storage unit 30m, a computer program including a processing procedure of the starting control of the internal combustion engine according to this embodiment, a control map, a data map of a fuel injection amount used for the reforming control, and the like are stored. Here, the storage unit 30m can be composed of a volatile memory such as an RAM (Random Access Memory), a nonvolatile memory such as a flash memory, or the combination of these.

The computer program may be one that can realize the processing procedure of the reforming control according to this embodiment by the combination with a computer program stored in the CPU 30p in advance. Moreover, the starting control device 30CA of this internal combustion engine may use dedicated hardware instead of the computer program to realize the functions of the heating control unit 31, the reforming control unit 32, the starting control unit 33 and the parameter setting unit 34. Next, the starting control of the internal combustion engine according to this embodiment is described. In this description, refer to FIGS. 1 and 2 as necessary.

Figure 5:
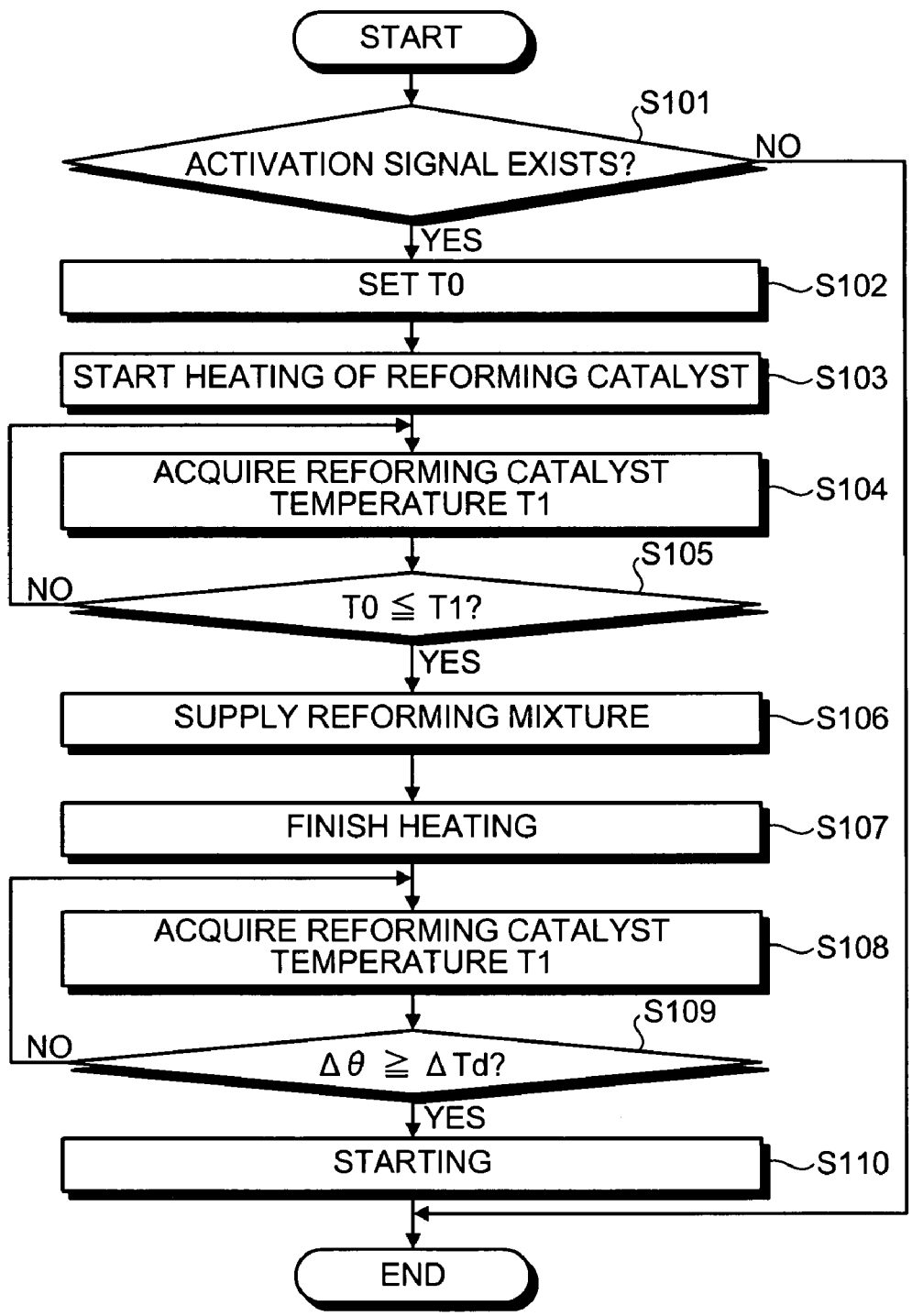
FIG. 5 is a flowchart explaining a procedure of starting control of the internal combustion engine according to Embodiment 1.
Figure 6:
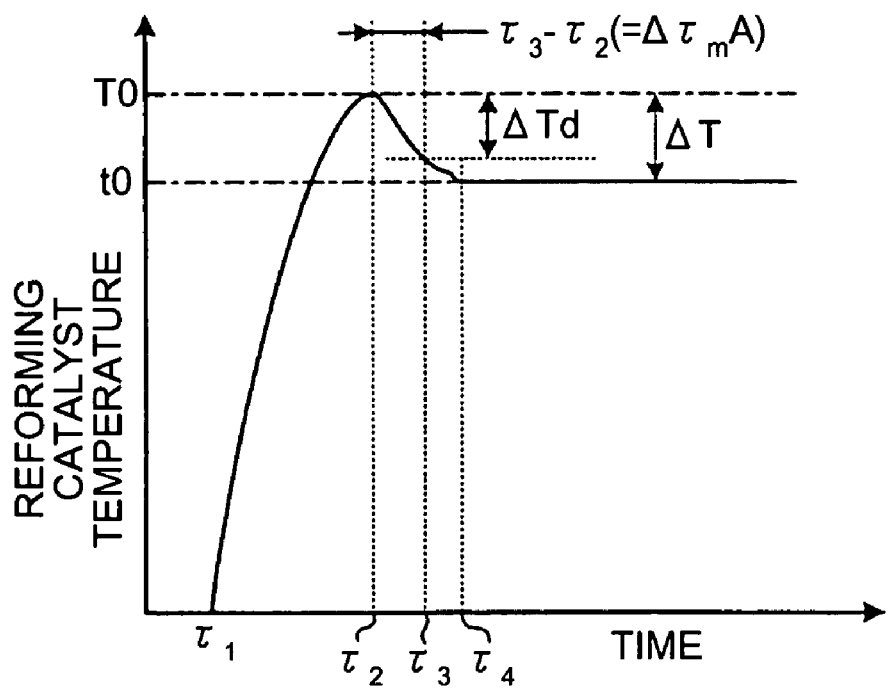
FIG. 6 is an explanatory chart showing a relation between the reforming catalyst temperature and time in the starting control of the internal combustion engine according to Embodiment 1.

FIG. 5 is a flowchart explaining a procedure of the starting control of the internal combustion engine according to Embodiment 1. FIG. 6 is an explanatory chart showing a relation between the reforming catalyst temperature and time in the starting control of the internal combustion engine according to Embodiment 1. In operating the internal combustion engine according to this embodiment, the heating control unit 31 included by the starting control device of the internal combustion engine according to this embodiment (hereinafter, the starting control device) 30CA determines whether or not there exists an activation signal of the internal combustion engine 1 from the starting switch 43 (step S101). If the activation signal does not exist (step S101: No), the starting control of the internal combustion engine according to the example ends.

As described above, in this embodiment, before the reforming is started, the reforming catalyst 10C is heated to the preheating temperature T0 higher than the adiabatic reaction temperature t0 (refer to FIG. 6). When the reforming catalyst 10C is heated to a temperature higher than the adiabatic reaction temperature t0 before the reforming starts, and then the reforming mixture Gm is supplied to the reforming catalyst 10C, vaporization heat of the fuel in the reforming mixture Gm and heat receiving of the mixture reduce the temperature of the reforming catalyst 10C. The magnitude of the temperature drop in the reforming catalyst 10C when the reforming mixture Gm is supplied to the heated reforming catalyst 10C is indicated by a catalyst temperature drop temperature $\Delta Td$ (FIG. 6). If at the start time of the partial oxidation reaction, the temperature of the reforming catalyst 10C becomes lower than the adiabatic reaction temperature t0, the generation amount of the unreformed HC increases.

Accordingly, the preheating temperature T0 is set larger than a value obtained by adding the catalyst temperature drop temperature $\Delta Td$ to the adiabatic reaction temperature t0 (T0(=t0+$\Delta T$)>(t0+$\Delta Td$)). That is, a temperature increase $\Delta T$ of the reforming catalyst 10C from the adiabatic reaction temperature t0 is set larger than the catalyst temperature drop temperature $\Delta Td$ ($\Delta T > \Delta Td$). Thereby, even when the reforming mixture Gm is supplied to the heated reforming catalyst 10C, the temperature of the reforming catalyst 10C can be maintained at a temperature higher than the adiabatic reaction temperature t0 at the start time of the partial oxidation reaction, so that the generation amount of the unreformed HC can be suppressed. Moreover, by setting T0>(t0+$\Delta Td$), that is, $\Delta T > \Delta Td$, the temperature of the reforming catalyst 10C approaches the adiabatic reaction temperature t0 from the higher temperature side when the reforming mixture Gm is supplied, which can suppress the generation amount of the unreformed HC at the time of reforming start to the minimum.

Figure 7:
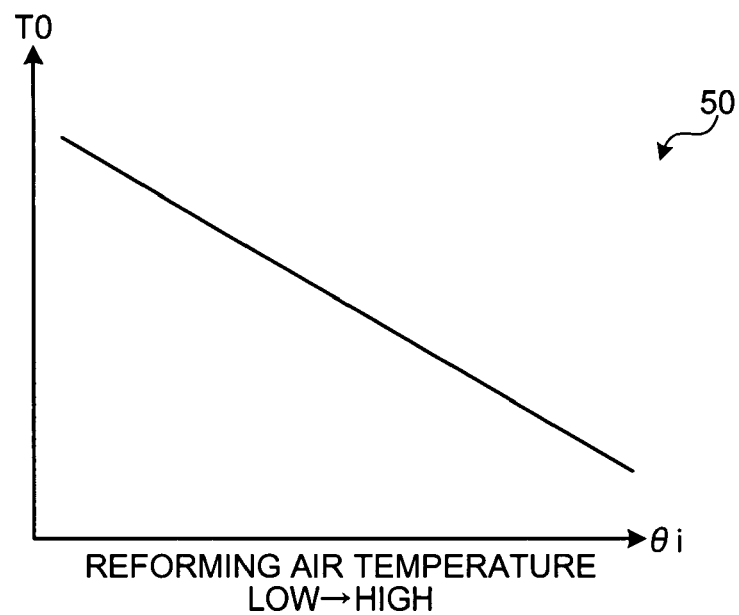
FIG. 7 is an explanatory chart showing a map used for setting of a preheating temperature.
Figure 8:
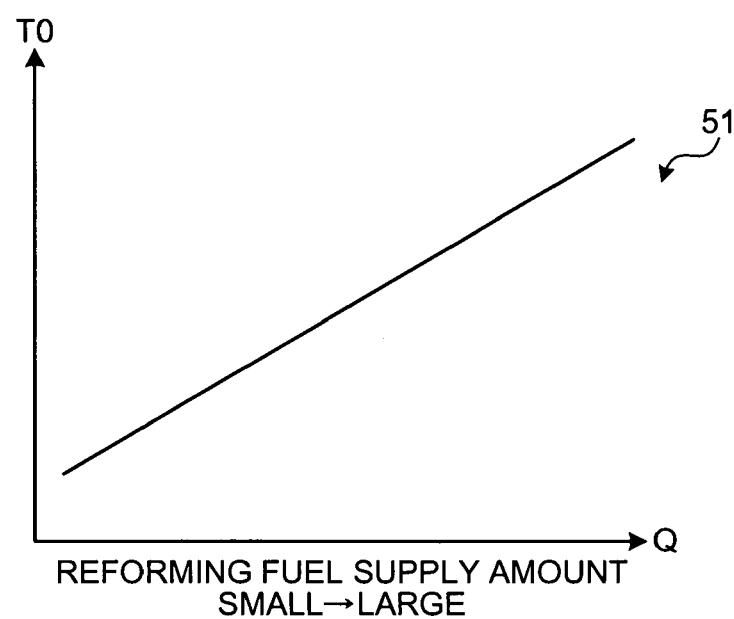
FIG. 8 is an explanatory chart showing a map used for setting of the preheating temperature.

FIGS. 7 and 8 are explanatory charts each showing a map used for setting of the preheating temperature. Although the preheating temperature T0 may be a fixed value, in this embodiment, the preheating temperature T0 is changed in accordance with an environmental condition and the like. For example, when the temperature of the reforming air Ar introduced to the reformer 10 is low, the temperature of the reforming mixture Gm is also low, and as a result, the catalyst temperature drop temperature $\Delta Td$ also increases. Accordingly, for example, as in a map 50 shown in FIG. 7, the preheating temperature T0 is set higher as a reforming air temperature $\theta i$ becomes lower.

Moreover, in the case where the supply amount of the reforming fuel Fr varies at the starting time of the internal combustion engine, a vaporization heat amount of the fuel and a heat receiving capacity of the reforming mixture Gm increases as the supply amount of the reforming fuel Fr becomes larger, and thus, the catalyst temperature drop temperature $\Delta Td$ becomes larger. In such a case, for example, as in a map 51 shown in FIG. 8, as a reforming fuel supply amount Q becomes larger, the preheating temperature T0 is set higher. Moreover, when the temperature of the reforming fuel Fr introduced to the reformer 10 is low, the temperature of the reforming mixture Gm is also low, and as a result, the catalyst temperature drop temperature $\Delta Td$ is also large. Accordingly, for example, as the temperature of the reforming fuel becomes lower, the preheating temperature T0 is set higher.

The preheating temperature T0 may be changed based on any one of the temperatures of the reforming air Ar, the supply amount of the reforming fuel Fr, and the temperature of reforming fuel Fr, or the combination of the two or more. Thus, it is preferable to change the preheating temperature T0 in accordance with at least one of the properties of the reforming air Ar or the properties of the reforming fuel Fr.

This allows the preheating temperature T0 to be surely set larger than the value obtained by adding the catalyst temperature drop temperature $\Delta Td$ to the adiabatic reaction temperature t0 even when the environmental condition and the like change. As a result, when the partial oxidation reaction starts in the reforming catalyst 10C, the temperature of the reforming catalyst 10C can be surely maintained at a temperature higher than the adiabatic reaction temperature t0, which can surely suppress the generation amount of the unreformed HC.

In the case where the activation signal exists (step S101: Yes), the parameter setting unit 34 of the starting control device 30CA acquires the temperature of the reforming air Ar from the reforming air temperature sensor 44 to set the preheating temperature T0 using the map 50 and the like (step S102). After the preheating temperature T0 is set, the heating control unit 31 turns the heater switch 15 ON to start the heating of the reforming catalyst 10C (step S103). Reference numeral $\tau_1$ in FIG. 6 denotes a heating start time.

Once the heating of the reforming catalyst 10C is started, the heating control unit 31 acquires a temperature T1 of the reforming catalyst 10C (hereinafter, reforming catalyst temperature) from the reforming catalyst temperature sensor 40 (step S104) to compare it with the preheating temperature T0 set in step S102 (step S105). The heating control unit 31 stands by until T0$\leq$T1 (step S105: No). When T0$\leq$T is satisfied, the reforming control unit 32 included by the starting control device 30CA drives the reforming fuel pump 25 and then operates the reforming fuel injection valve 20 to inject the reforming fuel Fr from the reforming fuel injection valve 20 to the mixing chamber 16 of the reformer 10. Moreover, the reforming control unit 32 drives the reforming air pump 24 and at the same time operates the reforming air supply valve 23 to supply the reforming air Ar to the mixing chamber 16 of the reformer 10.

Here, the supply amount of the reforming fuel Fr and the supply amount of the reforming air Ar are amounts that are necessary for the starting of the internal combustion engine 1, and satisfy O/C (oxygen/carbon)=1. In the case where the reforming fuel is gasoline, in order to satisfy O/C=1, an air-fuel ratio A/F is about 5. The reforming fuel Fr and the reforming air Ar, which have been supplied to the mixing chamber 16 of the reformer 10, are sufficiently mixed in the mixing chamber 16 to form the reforming mixture Gm. Thereafter, the reforming mixture Gm flows into the reforming catalyst 10C. This allows the reforming mixture Gm to be supplied to the reforming catalyst 10C (step S106). The supply time of the reforming mixture Gm is denoted by $\tau_2$ in FIG. 6.

Thereafter, the heating control unit 31 finishes the heating of the reformed catalyst 10C (step S107). A period $\Delta\tau$ from the supply of the reforming mixture Gm to the heating end can be set arbitrarily. For example, the period $\Delta\tau$ may be set in such a manner that the reforming mixture Gm is supplied and a decrease in the reforming catalyst temperature T1 reaches the catalyst temperature drop temperature $\Delta Td$, and then the heating of the reforming catalyst 10C is stopped ($\Delta\tau=\tau_3-\tau_2+\alpha$). This can suppress the catalyst temperature drop temperature $\Delta Td$ to a small value, which can suppress the generation of the unreformed HC. Also, the period $\Delta\tau$ may be set in such a manner that before a decrease in the reforming catalyst temperature T1 reaches the catalyst temperature drop temperature $\Delta Td$, the heating is stopped. The heating of the reforming catalyst 10C is finished before the starting of the internal combustion engine 1 ($\tau_4$ in FIG. 6). This is intended to prevent the heating period of the reforming catalyst 10C and the starting period of the internal combustion engine 1 from overlapping each other.

Moreover, while in this embodiment, the period $\Delta\tau$ is set to be a predetermined period, the heating of the reforming catalyst 10C may be finished simultaneously with the supply of the reforming mixture Gm, that is, the period $\Delta\tau=0$ is possible. This can reduce energy required for the heating of the reforming catalyst 10C. Furthermore, after the heating of the reforming catalyst 10C is finished, the reforming mixture Gm may be supplied. This can also reduce the energy required for the heating of the reforming catalyst 10C.

When the reforming mixture Gm is supplied to the reforming catalyst 10C, the starting control unit 33 acquires the reforming catalyst temperature T1 (step S108). The starting control unit 33 stands by until a difference $\Delta\theta$ between the preheating temperature T0 and the reforming catalyst temperature T1 becomes the catalyst temperature drop temperature $\Delta Td$ or more (step S109: No). When $\Delta\theta \geq \Delta Td$ (step S109: Yes) is satisfied, the starting control unit 33 drives the starter motor 26 to start the internal combustion engine 1 (step S110). That is, the starting control unit 33 stands by for a predetermined time $\Delta\tau mA$ ($=\tau_3-\tau_2$) after the reforming mixture Gm is supplied to the reforming catalyst 10C, and then starts the internal combustion engine 1 ($\tau_4$ in FIG. 6). Reference numeral $\tau_3$ in FIG. 6 denotes a time when $\Delta\theta \geq \Delta Td$ becomes satisfied. Here, in the case where the heating of the reforming catalyst 10C is continued, the heating is finished before the starting of the internal combustion engine 1.

In this manner, by starting the internal combustion engine 1 after the standby for the standby time $\Delta\tau mA$, the reformed gas Gr is generated in the reformer 10 and then, the internal combustion engine 1 is started. As a result, the drive of the starter motor 26 can be suppressed to the minimum, which can suppress the energy consumption by the starting of the internal combustion engine 1. Moreover, as in this embodiment, by starting the internal combustion engine 1 after the heating of the reforming catalyst 10C ends, the heating period of the reforming catalyst 10C and the drive period of the starter motor 26 do not overlap each other. As a result, in the case where the reforming catalyst 10C is heated electrically, a capacity of the power source can be suppressed. With the procedure, the starting control of the internal combustion engine according to this embodiment ends.

As described above, in this embodiment, before the partial oxidation reforming by the reforming unit is started, the temperature of the reforming catalyst included by the reforming unit is raised to the predetermined preheating temperature higher than the adiabatic reaction temperature in the partial oxidation reaction. This allows the temperature of the reforming catalyst to be maintained higher than the adiabatic reaction temperature of the partial oxidation reaction, even when the reforming mixture is supplied to the reforming catalyst. As a result, the generation of the unreformed HC can be suppressed to the minimum, and deterioration in emission at the starting time of the internal combustion engine can be suppressed. The constitution disclosed in Embodiment 1 can be applied to the following example as necessary. Moreover, the components having constitutions similar to those in Embodiment 1 have actions and effects similar to those in Embodiment 1.

Embodiment 2

Embodiment 2, although having a constitution substantially similar to that of Embodiment 1, is different in that only the reforming air is first supplied and then, the reforming fuel is supplied to the reforming catalyst. Other constitutions are similar to those of Embodiment 1. The starting control of an internal combustion engine according to Embodiment 2 can be realized by the starting control device of the internal combustion engine according to Embodiment 1 (refer to FIG. 4). In the following description, refer to FIGS. 1 and 4.

Figure 9:
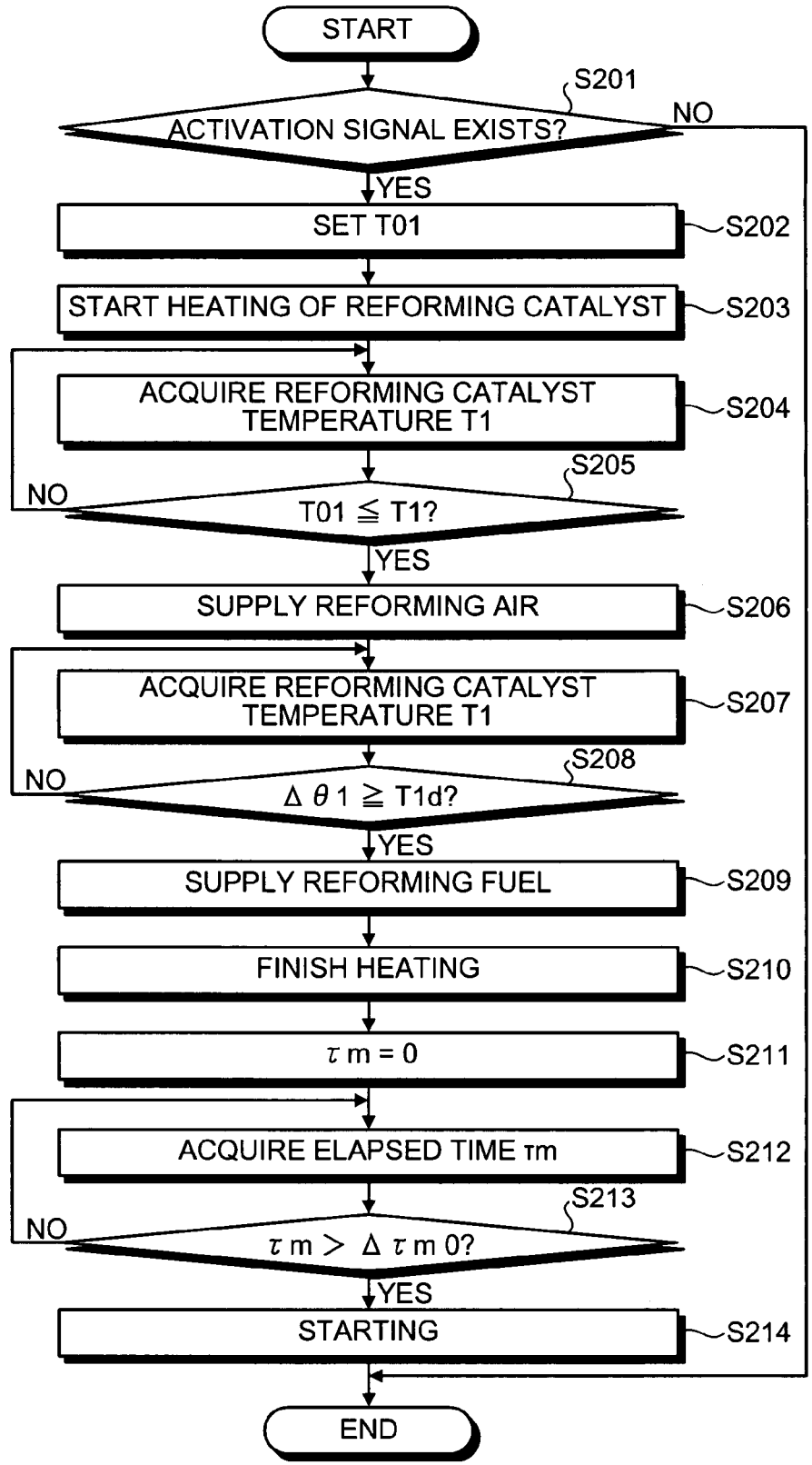
FIG. 9 is a flowchart explaining a procedure of starting control of an internal combustion engine according to Embodiment 2.
Figure 10:
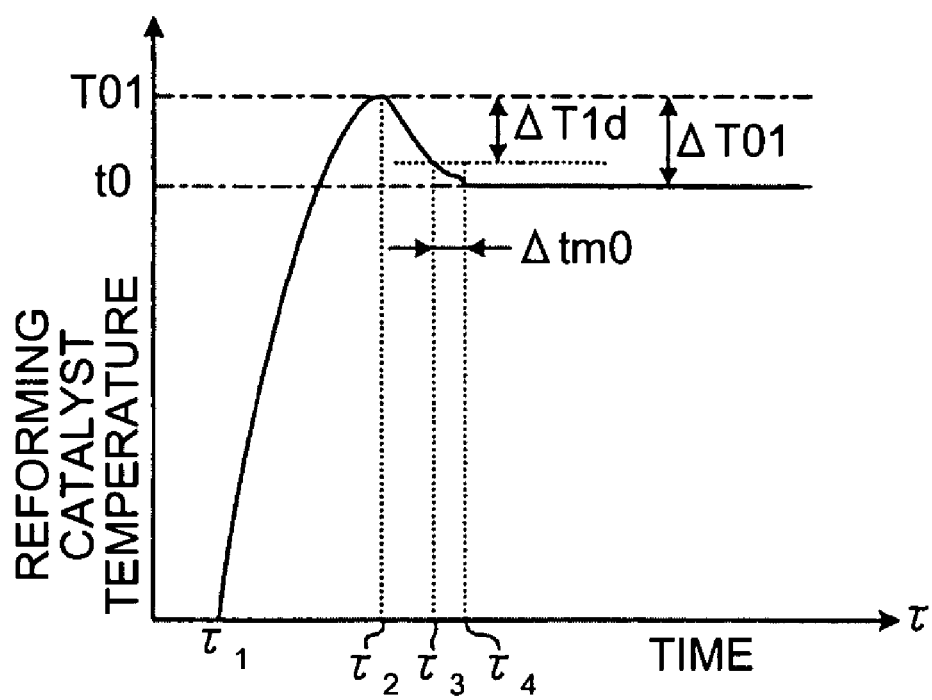
FIG. 10 is an explanatory chart showing a relation between a reforming catalyst temperature and time in the starting control of the internal combustion engine according to Embodiment 2.

FIG. 9 is a flowchart explaining a procedure of the starting control of the internal combustion engine according to Embodiment 2. FIG. 10 is an explanatory chart showing a relation between a reforming catalyst temperature and time in the starting control of the internal combustion engine according to Embodiment 2. In operating the internal combustion engine according to this embodiment, the heating control unit 31 included by the starting control device of the internal combustion engine (hereinafter, starting control device) 30CA determines whether or not an activation signal of the internal combustion engine 1 exists from the starting switch 43 (step S201). If the activation signal does not exist (step S201: No), the starting control of the internal combustion engine according to the example ends.

In this embodiment, also, before the reforming is started, the reforming catalyst 10C is heated to a preheating temperature T01 higher than the adiabatic reaction temperature t0 (refer to FIG. 10). When the reforming catalyst 10C is heated to a temperature higher than the adiabatic reaction temperature t0 before the start of reforming and then the reforming air Ar is supplied to the reforming catalyst 10C, the temperature of the reforming catalyst 10C drops. The magnitude of the temperature drop in the reforming catalyst 10C when the reforming air Ar is supplied to the heated reforming catalyst 10C is indicated by a catalyst temperature drop temperature $\Delta T1d$ (FIG. 10). If at the start time of the partial oxidation reaction, the temperature of the reforming catalyst 10C becomes lower than the adiabatic reaction temperature t0, the generation amount of the unreformed HC increases.

Accordingly, in this embodiment, the preheating temperature T01 is set larger than a value obtained by adding the catalyst temperature drop temperature $\Delta T1d$ to the adiabatic reaction temperature t0 (T01(=t0+$\Delta$T01)>(t0+$\Delta$T1d). That is, a temperature increase $\Delta$T01 of the reforming catalyst 10C from the adiabatic reaction temperature t0 is set larger than the catalyst temperature drop temperature $\Delta T1d$ ($\Delta$T01>$\Delta$T1d). Thereby, even when the reforming mixture Gm is supplied to the heated reforming catalyst 10C, the temperature of the reforming catalyst 10C can be maintained at a temperature higher than the adiabatic reaction temperature t0 at the start time of the partial oxidation reaction, so that the generation amount of the unreformed HC can be suppressed. Moreover, by setting T01>(t0+$\Delta$T1d), that is, $\Delta$T01>$\Delta$T1d, the temperature of the reforming catalyst 10C approaches the adiabatic reaction temperature t0 from the higher temperature side when the reforming fuel Fr is supplied, which can suppress the generation amount of the unreformed HC at the time of reforming start to the minimum.

In this embodiment, since only the reforming air Ar is first supplied to the reforming catalyst 10C, the temperature drop in the reforming catalyst 10C is smaller as compared with the case where the reforming mixture Gm is supplied to the reforming catalyst 10C. Therefore, the preheating temperature T01 may be a lower value than the preheating temperature T0 in Embodiment 1, which can be in the vicinity of adiabatic reaction temperature t0 in the partial oxidation reaction.

In the case where the activation signal exists (step S201: Yes), the parameter setting unit 34 of the starting control device 30CA acquires a temperature of the reforming air Ar from the reforming air temperature sensor 44 to set the preheating temperature T01 using the map 50 and the like (refer to FIG. 7 and the like) (step S202). After the preheating temperature T01 is set, the heating control unit 31 turns the heater switch 15 ON to start heating of the reforming catalyst 10C (step S203). Reference numeral $\tau_1$ in FIG. 10 denotes a heating start time.

Once the heating of the reforming catalyst 10C starts, the heating control unit 31 acquires the reforming catalyst temperature T1 from the reforming catalyst temperature sensor 40 (step S204) to compare it with the preheating temperature T01 set in step S202 (step S205). The heating control unit 31 stands by until T01$\leq$T1 (step S205: No). When T0$\leq$T1 is satisfied, the reforming control unit 32 included by the starting control device 30CA drives the reforming air pump 24 and at the same time, operates the reforming air supply valve 23 to supply the reforming air Ar to the mixing chamber 16 of the reformer 10 (step S206). The supply amount of the reforming air Ar at this time is an amount that is necessary for the starting of the internal combustion engine 1, and satisfies O/C (oxygen/carbon)=1. In the case where the reforming fuel is gasoline, in order to satisfy O/C=1, the air-fuel ratio A/F is about 5. The supply time of the reforming air Ar is $\tau_2$ in FIG. 10.

Thereafter, the heating control unit 31 acquires the reforming catalyst temperature T1 from the reforming catalyst temperature sensor 40 (step S207), and stands by until a difference $\Delta\theta1$ between the preheating temperature T01 and the reforming catalyst temperature T1 becomes the catalyst temperature drop temperature $\Delta T1d$ or more (step S208: No). This is intended to raise the reforming air Ar supplied to the reforming catalyst 10C to a temperature necessary for the reforming. When $\Delta\theta1 \geq \Delta T1d$ (step S208: Yes) is satisfied, the reforming control unit 32 drives the reforming fuel pump 25, and then operates the reforming fuel injection valve 20 to inject the reforming fuel Fr to the mixing chamber 16 of the reformer 10 from the reforming fuel injection valve 20 (step S209). The supply amount of the reforming fuel Fr at this time is an amount that is necessary for the starting of the internal combustion engine 1, and satisfies O/C (oxygen/carbon)=1. In the case where the reforming fuel is gasoline, in order to satisfy O/C=1, the air-fuel ratio A/F is about 5. The supply time of the reforming fuel Fr is denoted by $\tau_3$ in FIG. 10.

The reforming fuel Fr injected from the reforming fuel injection valve 20 is sufficiently mixed with the reforming air Ar, which has already been supplied to the mixing chamber 16, to form the reforming mixture Gm. Thereafter, the reforming mixture Gm flows into the reforming catalyst 10C, and the partial oxidation reaction starts. In this embodiment, since only the reforming air Ar is first supplied to the reforming catalyst 10C, the catalyst temperature drop temperature $\Delta T2d$ is smaller than that in the case where the reforming mixture Gm is supplied, and thus, even if the preheating temperature T01 is set to the vicinity of the adiabatic reaction temperature t0, the reforming catalyst temperature T1 at the point of time when the reforming fuel Fr is supplied to the reforming catalyst 10C does not largely deviate from the adiabatic reaction temperature t0. Thus, in this embodiment, since the preheating temperature T01 can be set to the vicinity of the adiabatic reaction temperature t0, high-temperature durability of the reformer 10 can be improved.

Moreover, since only the reforming air Ar is first supplied to the reforming catalyst 10C, the drop in the reforming catalyst temperature T1 by supplying the reforming fuel Fr is small. Furthermore, since only the reforming air Ar is first supplied to the reforming catalyst 10C, at an initial stage when the reforming fuel Fr reaches the reforming catalyst 10C, O/C>1, that is, an oxygen excess state is obtained, which will hasten the rise of the reaction temperature of the partial oxidation reaction. As a result, the generation amount of the unreformed HC can be suppressed. Thus, it this embodiment, the reforming properties can be improved.

When the reforming fuel Fr is injected, the heating control unit 31 finishes the heating of the reforming catalyst 10C (step S210). In this embodiment, the heating end time of the reforming catalyst 10C is the supply time of the reforming fuel Fr, that is, $\tau_3$ in FIG. 10. This can reduce the energy required for the heating of the reforming catalyst 10C. After the heating of the reforming catalyst 10C has been finished, that is, before the reforming fuel Fr is supplied, the heating may be finished, and then the reforming fuel Fr may be supplied. This can also reduce the energy required for the heating of the reforming catalyst 10C.

Furthermore, the standby for a predetermined period may be provided after the reforming fuel Fr has been supplied, and then the heating of the reforming catalyst 10C may be finished before the starting of the internal combustion engine 1. In this case, the heating of the reforming catalyst 10C may be continued until just before the internal combustion engine 1 starts. This can suppress the temperature drop of the reforming catalyst temperature T1 after the reforming fuel Fr is supplied, which can suppress the generation of the unreformed HC.

At the point of time when the reforming air Ar is supplied to the reforming catalyst 10C, or later, the heating of the reforming catalyst 10C may be stopped. This can suppress the drop in the reforming catalyst temperature T1. Moreover, before the reforming air Ar is supplied to the reforming catalyst 10C, the heating of the reforming catalyst 10C may be stopped. This can reduce the energy required for the heating of the reforming catalyst 10C. Moreover, the heating of the reforming catalyst 10C is finished before the starting ($\tau_4$ in FIG. 10) of the internal combustion engine 1. This is intended to prevent the heating period of the reforming catalyst 10C and the starting period of the internal combustion engine 1 from overlapping each other.

When the heating of the reforming catalyst 10C is finished and the supply of the reforming fuel Fr is started, the starting control unit 33 sets an elapsed time τm to 0 (step S211). The starting control unit 33 acquires the elapsed time τm from the point of time when the elapsed time τm is set to 0, that is, the point of time when the heating of the reforming catalyst 10C is finished and the supply of the reforming fuel Fr is started (step S212), and stands by until τm>Δτm0 (step S213: No).

If τm>Δτm0 is satisfied (step S213: Yes), the starting control unit 33 drives the starter motor 26 to start the internal combustion engine 1 (step S214, $\tau_4$ in FIG. 10). At this time, in the case where the heating of the reforming catalyst 10C continues, the heating is finished before the starting of the internal combustion engine 1. Thus, by starting the internal combustion engine 1 after standing by for the standby time Δτm0, the air existing between the reforming catalyst 10C and the combustion chamber 1B of the internal combustion engine 1 due to the supply of the reforming air Ar in the first place can be replaced with the reformed gas Gr. This can minimize the necessity for idling of the internal combustion engine 1 for exhausting the air. As a result, since the drive of the starter motor 26 can be suppressed to the minimum, the energy consumption by the starting of the internal combustion engine 1 can be suppressed.

Furthermore, as in this embodiment, by starting the internal combustion engine 1 after the heating of the reforming catalyst 10C is finished, the heating period of the reforming catalyst 10C and the drive period of the starter motor 26 do not overlap each other. As a result, in the case where the reforming catalyst 10C is electrically heated, the capacity of the power source can be suppressed. With the procedure, the starting control of the internal combustion engine according to this embodiment ends.

As described above, in this embodiment, before the partial oxidation reforming by the reforming unit is started, the temperature of the reforming catalyst included by the reforming unit is raised to the predetermined preheating temperature higher than the adiabatic reaction temperature in the partial oxidation reaction. In addition, only the reforming air is first supplied to the reforming catalyst, and then the reforming fuel is supplied to the reforming catalyst. Thus, since only the reforming air is first supplied to the reforming catalyst, the drop in the reforming catalyst temperature by the supply of the reforming fuel can be made smaller. Moreover, since only the reforming air is first supplied to the reforming catalyst, the oxygen excess state is obtained at the initial stage when the reforming fuel reaches the reforming catalyst, which hastens the rise of the reaction temperature in the partial oxidation reaction. As a result, the unreformed generation amount can be effectively suppressed, and the emission deterioration at the starting time of the internal combustion engine can be more effectively suppressed. The constitution disclosed in Embodiment 2 can be applied to the following example as necessary. The components having the constitutions similar to those in Embodiment 2 have actions and effects similar to those in Embodiment 2.

Embodiment 3

Embodiment 3, although having a constitution substantially similar to that of Embodiment 2, is different in that the preheating temperature is set lower than the adiabatic reaction temperature of the partial reforming reaction. Other constitutions are similar to those of Embodiment 2. The starting control of an internal combustion engine according to Embodiment 3 can be realized by the starting control device of the internal combustion engine according to Embodiment 1 (refer to FIG. 4). In the following description, refer to FIGS. 1 and 4 as necessary.

Figure 11:
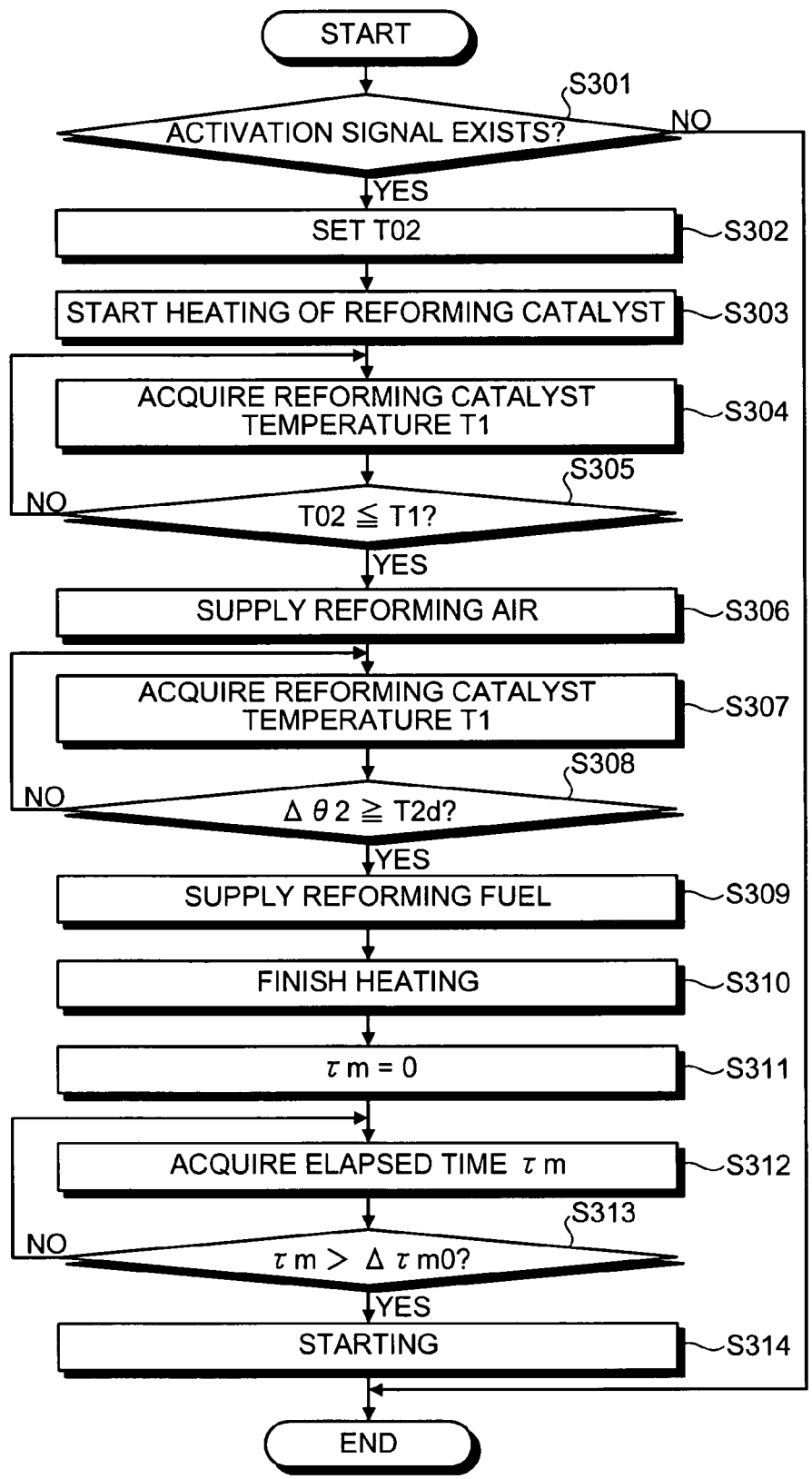
FIG. 11 is a flowchart explaining a procedure of starting control of an internal combustion engine according to Embodiment 3.
Figure 12:
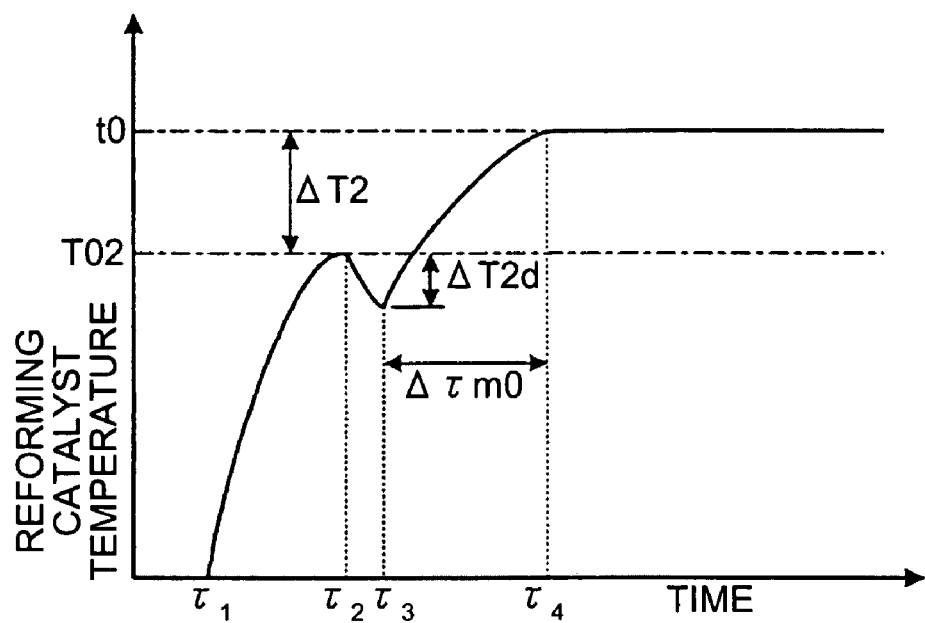
FIG. 12 is an explanatory chart showing a relation between a reforming catalyst temperature and time in the starting control of the internal combustion engine according to Embodiment 3.

FIG. 11 is a flowchart explaining a procedure of the starting control of the internal combustion engine according to Embodiment 3. FIG. 12 is an explanatory chart showing a relation between the reforming catalyst temperature and time in the starting control of the internal combustion engine according to Embodiment 3. In this embodiment, before the reforming is started, the reforming catalyst 10C is heated to a preheating temperature T02 which is a temperature lower than the adiabatic reaction temperature t0 (refer to FIG. 12). In operating the internal combustion engine according to this embodiment, the heating control unit 31 included by the starting control device of the internal combustion engine (hereinafter, starting control device) 30CA determines whether or not an activation signal of the internal combustion engine 1 exists from the starting switch 43 (step S301). If the activation signal does not exist (step S301: No), the starting control of the internal combustion engine according to the example ends.

In the case where the activation signal exists (step S301: Yes), the parameter setting unit 34 of the starting control device 30CA acquires the temperature of the reforming air Ar from the reforming air temperature sensor 44 to set the preheating temperature T02 (step S302). As described in Embodiment 1, the preheating temperature T02 can be changed in accordance with an environmental condition or the like.

As described above, the preheating temperature T02 is lower than the adiabatic reaction temperature t0 by ΔT2. Thus, in this embodiment, since the preheating temperature T02 is set to a temperature lower than the adiabatic reaction temperature t0, the energy required for the heating of the reforming catalyst 10C can be reduced. Moreover, since the preheating temperature T02 can be set lower, the high temperature durability of the reformer 10 can be improved. Here, if the preheating temperature T02 is too low, the unreformed HC amount increases, and thus, the preheating temperature T02 is determined within a range where the generation amount of the unreformed HC is acceptable.

After the preheating temperature T02 is set, the heating control unit 31 turns the heater switch 15 ON to start the heating of the reforming catalyst 10C (step S303). Reference numeral $\tau_1$ in FIG. 12 denotes the heating start time. Once the heating of the reforming catalyst 10C is started, the heating control unit 31 acquires the reforming catalyst temperature T1 from the reforming catalyst temperature sensor 40 (step S304) to compare it with the preheating temperature T02 set in step S302 (step S305). The heating control unit 31 stands by until T02≦T1 (step S305: No). When T02≦T1 is satisfied, the reforming control unit 32 included by the starting control device 30CA drives the reforming air pump 24, and at the same time operates the reforming air supply valve 23 to supply the reforming air Ar to the mixing chamber 16 of the reformer 10 (step S306). The supply amount of the reforming air Ar at this time is an amount that is necessary for the starting of the internal combustion engine 1, and satisfies O/C (oxygen/carbon)=1. In the case where the reforming fuel is gasoline, in order to satisfy O/C=1, the air-fuel ratio A/F is about 5. The supply time of the reforming air Ar is denoted by $\tau_2$ in FIG. 12.

Thereafter, the heating control unit 31 acquires the reforming catalyst temperature T1 from the reforming catalyst temperature sensor 40 (step S307), and stands by until a difference $\Delta\theta 2$ between the preheating temperature T02 and the reforming catalyst temperature T1 becomes predetermined catalyst temperature drop temperature $\Delta T2d$ or more (step S308: No). This is intended to raise the reforming air Ar supplied to the reforming catalyst 10C to a temperature necessary for the reforming. When $\Delta\theta 2 \geq \Delta T2d$ is satisfied (step S308: Yes), the reforming control unit 32 drives the reforming fuel pump 25, and then operates the reforming fuel injection valve 20 to inject the reforming fuel Fr to the mixing chamber 16 of the reformer 10 from the reforming fuel injection valve 20 (step S309). The supply amount of the reforming fuel Fr at this time is an amount that is necessary for the starting of the internal combustion engine 1, and satisfies O/C (oxygen/carbon)=1. In the case where the reforming fuel is gasoline, in order to satisfy O/C=1, the air-fuel ratio A/F is about 5. The supply time of the reforming fuel Fr is denoted by $\tau_3$ in FIG. 12.

The reforming fuel Fr injected from the reforming fuel injection valve 20 is sufficiently mixed with the reforming air Ar, which has already been supplied to the mixing chamber 16, to form the reforming mixture Gm. Thereafter, the reforming mixture Gm flows into the reforming catalyst 10C and the partial oxidation reaction starts. When the reforming fuel Fr is injected to the reforming catalyst 10C, the partial oxidation reaction starts and the reforming catalyst temperature T1 is raised by the reaction heat as shown in FIG. 12.

In this embodiment, since only the reforming air Ar is first supplied to the reforming catalyst 10C, the drop in the reforming catalyst temperature T1 by supplying the reforming fuel Fr can be suppressed to be small. Furthermore, since only the reforming air Ar is first supplied to the reforming catalyst 10C, at the initial stage when the reforming fuel Fr reaches the reforming catalyst 10C, O/C>1, that is, an oxygen excess state is obtained, which will hasten the rise of the reaction temperature of the partial oxidation reaction. As a result, the generation amount of the unreformed HC can be further suppressed.

When the reforming fuel Fr is injected, the heating control unit 31 finishes the heating of the reforming catalyst 10C (step S310). In this embodiment, the heating end time of the reforming catalyst 10C is the supply time of the reforming fuel Fr, that is, $\tau_3$ in FIG. 10. This can reduce the energy required for the heating of the reforming catalyst 10C. The standby for a predetermined period may be provided after the reforming fuel Fr is supplied, and then the heating of the reforming catalyst 10C may be finished before the starting of the internal combustion engine 1. Also, the heating of the reforming catalyst 10C may be continued until just before the internal combustion engine 1 is started. This allows the reforming catalyst temperature T1 to reach the adiabatic reaction temperature t0 faster, which can suppress the generation of the unreformed HC. The heating of the reforming catalyst 10C is finished before the starting of the internal combustion engine 1 ($\tau_4$ in FIG. 12). This is intended to prevent the heating period of the reforming catalyst 10C and the starting period of the internal combustion engine 1 from overlapping each other.

When the heating of the reforming catalyst 10C is finished and the supply of the reforming fuel Fr is started, the starting control unit 33 sets the elapsed time $\tau$m to 0 (step S311). The starting control unit 33 acquires the elapsed time $\tau$m from the point of time when the elapsed time $\tau$m is set to 0, that is, the point of time when the heating of the reforming catalyst 10C is finished and the supply of the reforming fuel Fr is started (step S312), and stands by until $\tau m > \Delta\tau m0$ (step S313: No).

If $\tau m > \Delta\tau m0$ is satisfied (step S313: Yes), the starting control unit 33 drives the starter motor 26 to start the internal combustion engine 1 (step S314, $\tau_4$ in FIG. 12). At this time, in the case where the heating of the reforming catalyst 10C continues, the heating is finished before the starting of the internal combustion engine 1. Thus, by starting the internal combustion engine 1 after standing by for the standby time $\Delta\tau m0$, the air existing between the reforming catalyst 10C and the combustion chamber 1B of the internal combustion engine 1 due to the supply of the reforming air Ar in the first place can be replaced with the reformed gas Gr. This can minimize the necessity for idling of the internal combustion engine 1 for exhausting the air. As a result, since the drive of the starter motor 26 can be suppressed to the minimum, the energy consumption by the starting of the internal combustion engine 1 can be suppressed.

Furthermore, as in this embodiment, by starting the internal combustion engine 1 after the heating of the reforming catalyst 10C is finished, the heating period of the reforming catalyst 10C and the drive period of the starter motor 26 do not overlap each other. As a result, in the case where the reforming catalyst 10C is electrically heated, the capacity of the power source can be suppressed. With the procedure, the starting control of the internal combustion engine according to this embodiment ends.

As described above, in Embodiment 3, before the partial oxidation reforming by the reforming unit is started, the temperature of the reforming catalyst is raised to the preheating temperature lower than the adiabatic reaction temperature in the partial oxidation reaction by the predetermined temperature. This can reduce the energy required for the heating of the reforming catalyst and the generation amount of the unreformed HC, which can suppress emission deterioration at the starting time of the internal combustion engine.

INDUSTRIAL APPLICABILITY

As described above, the internal combustion engine and the starting control device of the internal combustion engine according to the present invention are useful as, and for an internal combustion engine in which fuel is supplied to exhaust gas to generate reformed gas containing hydrogen, and particularly are suited for suppressing an increase in unreformed HC.

The invention claimed is:

1. An internal combustion engine, which is an internal combustion engine driven by igniting a mixture of air and fuel with a spark unit to thereby combust the fuel in a combustion chamber, the internal combustion engine comprising:
a reforming unit that reforms a reforming mixture of reforming fuel and reforming air by a reforming catalyst to generate reformed gas containing hydrogen and supply this reformed gas to the combustion chamber;
a reforming catalyst heating unit that raises a temperature of the reforming catalyst to a predetermined preheating temperature higher than an adiabatic reaction temperature in partial oxidation reaction of the reforming fuel, before the reforming mixture is supplied to the reforming catalyst; and
a starting unit that starts the internal combustion engine, wherein the engine is started after the reforming by the reforming catalyst starts.

2. The internal combustion engine according to claim 1, wherein the preheating temperature is higher than a sum of the adiabatic reaction temperature in the partial oxidation reaction and a temperature of the reforming catalyst that drops from the supply of the reforming mixture to the reforming catalyst till the start of the partial oxidation reaction.

3. The internal combustion engine according to claim 2, wherein after the reforming mixture is supplied to the reforming catalyst, the temperature of the reforming catalyst becomes lower than a difference between the preheating temperature and the temperature of the reforming catalyst that drops until the partial oxidation reaction starts, and then the starting unit starts the internal combustion engine.

4. The internal combustion engine according to claim 2, wherein before the starting of the internal combustion engine, the heating by the reforming catalyst heating unit is stopped.

5. The internal combustion engine according to claim 4, wherein at the point of time when the reforming mixture is supplied to the reforming catalyst or later, the heating by the reforming catalyst heating unit is stopped.

6. The internal combustion engine according to claim 4, wherein the heating of the reforming catalyst by the reforming catalyst heating unit is stopped, and then the reforming mixture is supplied to the reforming catalyst.

7. The internal combustion engine according to claim 1, wherein the preheating temperature is changed in accordance with at least one of properties of the reforming air and properties of the reforming fuel.

8. An internal combustion engine, which is an internal combustion engine driven by igniting a mixture of air and fuel with a spark unit to thereby combust the fuel in a combustion chamber, the internal combustion engine comprising:
- a reforming unit that reforms a reforming mixture of reforming fuel and reforming air by a reforming catalyst to generate reformed gas containing hydrogen and supply this reformed gas to the combustion chamber;
- a reforming catalyst heating unit in which the reforming air is first supplied to the reforming catalyst, and then the reforming fuel is supplied to the reforming catalyst, and before the reforming air is supplied to the reforming unit, a temperature of the reforming catalyst is raised to a predetermined preheating temperature higher than an adiabatic reaction temperature in partial oxidation reaction of the reforming fuel; and
- a starting unit that starts the internal combustion engine after the reforming by the reforming catalyst starts,
- wherein the engine is started after the reforming by the reforming catalyst starts.

9. The internal combustion engine according to claim 8, wherein the preheating temperature is higher than a sum of the adiabatic reaction temperature in the partial oxidation reaction and a temperature of the reforming catalyst that drops by the supply of the reforming air to the reforming catalyst.

10. The internal combustion engine according to claim 8, wherein before the starting of the internal combustion engine, the heating of the reforming catalyst by the reforming catalyst heating unit is stopped.

11. The internal combustion engine according to claim 10, wherein a predetermined standby time elapses after the reforming fuel is supplied to the reforming catalyst, and then the starting unit starts the internal combustion engine.

12. The internal combustion engine according to claim 10, wherein at the point of time when the reforming air is supplied to the reforming catalyst or later, the heating of the reforming catalyst by the reforming catalyst heating unit is stopped.

13. The internal combustion engine according to claim 10, wherein before the reforming air is supplied to the reforming catalyst, the heating of the reforming catalyst by the reforming catalyst heating unit is stopped.

14. The internal combustion engine according to claim 10, wherein at the point of time when the reforming fuel is supplied to the reforming catalyst or later, the heating of the reforming catalyst by the reforming catalyst heating unit is stopped.

15. The internal combustion engine according to claim 10, wherein the heating of the reforming catalyst by the reforming catalyst heating unit is stopped, and then the reforming fuel is supplied to the reforming catalyst.

16. The internal combustion engine according to claim 8, wherein the preheating temperature is changed in accordance with at least one of properties of the reforming air and properties of the reforming fuel.

17. A starting control device of an internal combustion engine, which controls an internal combustion engine driven by igniting a mixture of air and fuel with a spark unit to thereby combust the fuel in a combustion chamber, and comprising a reforming unit that reforms a reforming mixture of reforming fuel and reforming air by a reforming catalyst to generate reformed gas containing hydrogen and supply this reformed gas to the combustion chamber, and a reforming catalyst heating unit that raises a temperature of the reforming catalyst, the starting control device comprising:
- a heating control unit that raises the temperature of the reforming catalyst to a predetermined preheating temperature higher than an adiabatic reaction temperature in partial oxidation reaction of the reforming fuel by the reforming catalyst heating unit, before the reforming mixture is supplied to the reforming catalyst;
- a reforming control unit that supplies the reforming mixture to the reforming catalyst after the temperature of the reforming catalyst becomes higher than the preheating temperature; and
- a starting control unit that starts the internal combustion engine after the reforming by the reforming catalyst starts.

18. A starting control device of an internal combustion engine, which controls an internal combustion engine driven by igniting a mixture of air and fuel with a spark unit to thereby combust the fuel in a combustion chamber, and comprising a reforming unit that reforms a reforming mixture of reforming fuel and reforming air by a reforming catalyst to generate reformed gas containing hydrogen and supply this reformed gas to the combustion chamber, and a reforming catalyst heating unit that raises a temperature of the reforming catalyst, the starting control device comprising:
- a heating control unit that raises the temperature of the reforming catalyst to a predetermined preheating temperature higher than an adiabatic reaction temperature in partial oxidation reaction of the reforming fuel by the reforming catalyst heating unit, before the reforming air is supplied to the reforming catalyst;
- a reforming control unit that supplies the reforming air to the reforming catalyst after the temperature of the reforming catalyst becomes higher than the preheating temperature, and then the reforming fuel is supplied to the reforming catalyst; and
- a starting control unit that starts the internal combustion engine after the reforming by the reforming catalyst starts.

* * * * *

UNITED STATES PATENT AND TRADEMARK OFFICE
CERTIFICATE OF CORRECTION

| | | |
|---|---|---|
| PATENT NO. | : 7,530,335 B2 | Page 1 of 1 |
| APPLICATION NO. | : 11/793310 | |
| DATED | : May 12, 2009 | |
| INVENTOR(S) | : Kazuhiro Sakurai et al. | |

It is certified that error appears in the above-identified patent and that said Letters Patent is hereby corrected as shown below:

Title page
Please correct the PCT No. as follows:

Item (86)   PCT No.: PCT/JP2006/315318

Signed and Sealed this

Twenty-first Day of July, 2009

JOHN DOLL
*Acting Director of the United States Patent and Trademark Office*